(12) United States Patent
Wang et al.

(10) Patent No.: US 9,425,693 B2
(45) Date of Patent: Aug. 23, 2016

(54) SYSTEMS AND METHODS FOR HIGH POWER DC/DC CONVERSION USING VOLTAGE CONVERTER CELLS

(71) Applicant: The Boeing Company, Chicago, IL (US)

(72) Inventors: Duanyang Wang, Harrison, NJ (US); Dariusz Czarkowski, S. Setauket, NY (US); Francisco de Leon, Ridgewood, NJ (US); Kamiar J. Karimi, Kirkland, WA (US); Lijun Gao, Renton, WA (US); Shengyi Liu, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 174 days.

(21) Appl. No.: 14/314,003

(22) Filed: Jun. 24, 2014

(65) Prior Publication Data

US 2014/0307481 A1  Oct. 16, 2014

Related U.S. Application Data

(63) Continuation-in-part of application No. 13/251,527, filed on Oct. 3, 2011, now Pat. No. 8,792,253.

(51) Int. Cl.
*H02M 3/335* (2006.01)
*H02M 3/28* (2006.01)
*H02M 1/00* (2006.01)

(52) U.S. Cl.
CPC ..... *H02M 3/285* (2013.01); *H02M 2001/0077* (2013.01)

(58) Field of Classification Search
CPC ............... H02M 3/285; H02M 3/335; H02M 3/33523; H02M 2001/0077; H02M 3/337; H02M 3/3376; H02J 9/04
USPC ........ 363/16–20, 21.02, 58, 65, 69, 98, 131; 323/222, 225, 266, 267, 271–272, 323/282–289; 307/9.1, 82, 61, 144
See application file for complete search history.

(56) References Cited

U.S. PATENT DOCUMENTS

| | | | |
|---|---|---|---|
| 3,986,097 A * | 10/1976 | Woods | H04M 19/08 363/20 |
| 5,130,561 A | 7/1992 | Elliott et al. | |
| 6,069,801 A | 5/2000 | Hodge, Jr. et al. | |
| 7,468,649 B2 | 12/2008 | Chandrasekaran | |
| 7,646,178 B1 | 1/2010 | Fradella | |
| 7,746,041 B2 | 6/2010 | Xu et al. | |
| 7,830,686 B2 | 11/2010 | Zeng et al. | |
| 8,269,141 B2 | 9/2012 | Daniel et al. | |
| 8,581,147 B2 | 11/2013 | Kooken et al. | |
| 8,780,585 B2 * | 7/2014 | Ye | H02M 3/285 363/17 |

(Continued)

*Primary Examiner* — Yemane Mehari
(74) *Attorney, Agent, or Firm* — McDonnell Boehnen Hulbert & Berghoff LLP

(57) ABSTRACT

A voltage conversion system and methods are disclosed. Voltage converter cells are controlled using interleaved phase-shift modulation signals, and convert an input electrical current at an input voltage to an output electrical current at an output voltage. Each of the voltage converter cells comprises: a transformer comprising a primary side and a secondary side, a full-bridge voltage converter connected in parallel to the primary side, and center-tapped rectifiers connected in series to the secondary side. One or more group of outputs of the voltage converters are coupled in series via the center-tapped rectifiers.

20 Claims, 11 Drawing Sheets

(56) References Cited

U.S. PATENT DOCUMENTS

| | | | | |
|---|---|---|---|---|
| 8,829,713 B2 * | 9/2014 | Ishigaki | ............... | B60R 25/00 307/66 |
| 2012/0313430 A1 | 12/2012 | Wu et al. | | |
| 2012/0313431 A1 | 12/2012 | Shum et al. | | |
| 2014/0307483 A1 * | 10/2014 | Sigamani | ............. | H02M 3/33546 363/21.02 |

* cited by examiner ary voltage waveforms for a two cell topology according to

SYSTEMS AND METHODS FOR HIGH POWER DC/DC CONVERSION USING VOLTAGE CONVERTER CELLS

CROSS-REFERENCE TO RELATED APPLICATION

This application claims priority under 35 U.S.C. 120 to and is a continuation-in-part application of U.S. patent application Ser. No. 13/251,527 filed on 3 Oct. 2011, content of which is incorporated herein by reference in its entirety.

FIELD

Embodiments of the present disclosure relate generally to electronic power regulators. More particularly, embodiments of the present disclosure relate to electronic DC-to-DC converters.

BACKGROUND

A DC-to-DC converter is an electronic circuit which converts a source of direct current (DC) from one voltage level to another. DC-to-DC converters are important in a variety of application such as power systems and portable electronic devices. DC-to-DC converters may also regulate an output voltage. A step-up/boost converter is a converter with an output DC voltage greater than its input DC voltage. A step-down/buck converter is a converter with a DC output voltage lower than its DC input voltage.

SUMMARY

A voltage conversion system and methods are disclosed. Voltage converter cells are controlled using interleaved phase-shift modulation signals, and convert an input electrical current at an input voltage to an output electrical current at an output voltage. Each of the voltage converter cells comprises: a transformer comprising a primary side and a secondary side, a full-bridge voltage converter connected in parallel to the primary side, and center-tapped rectifiers connected in series to the secondary side. One or more group of outputs of the voltage converters are coupled in series via the center-tapped rectifiers.

For example, embodiments of the disclosure provide a means to integrate a low voltage power source such as a fuel cell stack or a battery (typically about 40 to about 60 Vdc) with an aircraft electric power distribution system where regulated dual polarity of about 270 Vdc for powering DC loads and single polarity of about 600 to about 800 Vdc for voltage source inverters are required.

In an embodiment, a voltage conversion system comprises voltage converter cells controlled using interleaved phase-shift modulation signals that convert an input electrical current at an input voltage to an output electrical current at an output voltage. Each of the voltage converter cells comprises a transformer comprising a primary side and a secondary side, a full-bridge voltage converter connected in parallel to the primary side, and center-tapped rectifiers connected in series to the secondary side. One or more group of outputs of the voltage converters are coupled in series via the center-tapped rectifiers.

In another embodiment, a method for voltage conversion generates a plurality of phase-shift modulation signals, and interleaves the phase-shift modulation signals to provide interleaved phase-shift modulation signals. The method further controls voltage converter cells using the interleaved phase-shift modulation signals to convert an input electrical current at an input voltage to an output electrical current at an output voltage. Each of the voltage converter cells comprises a transformer comprising a primary side and a secondary side, a full-bridge voltage converter connected in parallel to the primary side, and center-tapped rectifiers connected in series to the secondary side. One or more group of outputs of the voltage converters are coupled in series via the center-tapped rectifiers.

In a further embodiment, a method for providing a voltage conversion system provides voltage converter cells controlled using interleaved phase-shift modulation signals, and operable to convert an input electrical current at an input voltage to an output electrical current at an output voltage. Each of the voltage converter cells comprises a transformer comprising a primary side and a secondary side, a full-bridge voltage converter connected in parallel to the primary side, and center-tapped rectifiers connected in series to the secondary side. One or more group of outputs of the voltage converters are coupled in series via the center-tapped rectifiers This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
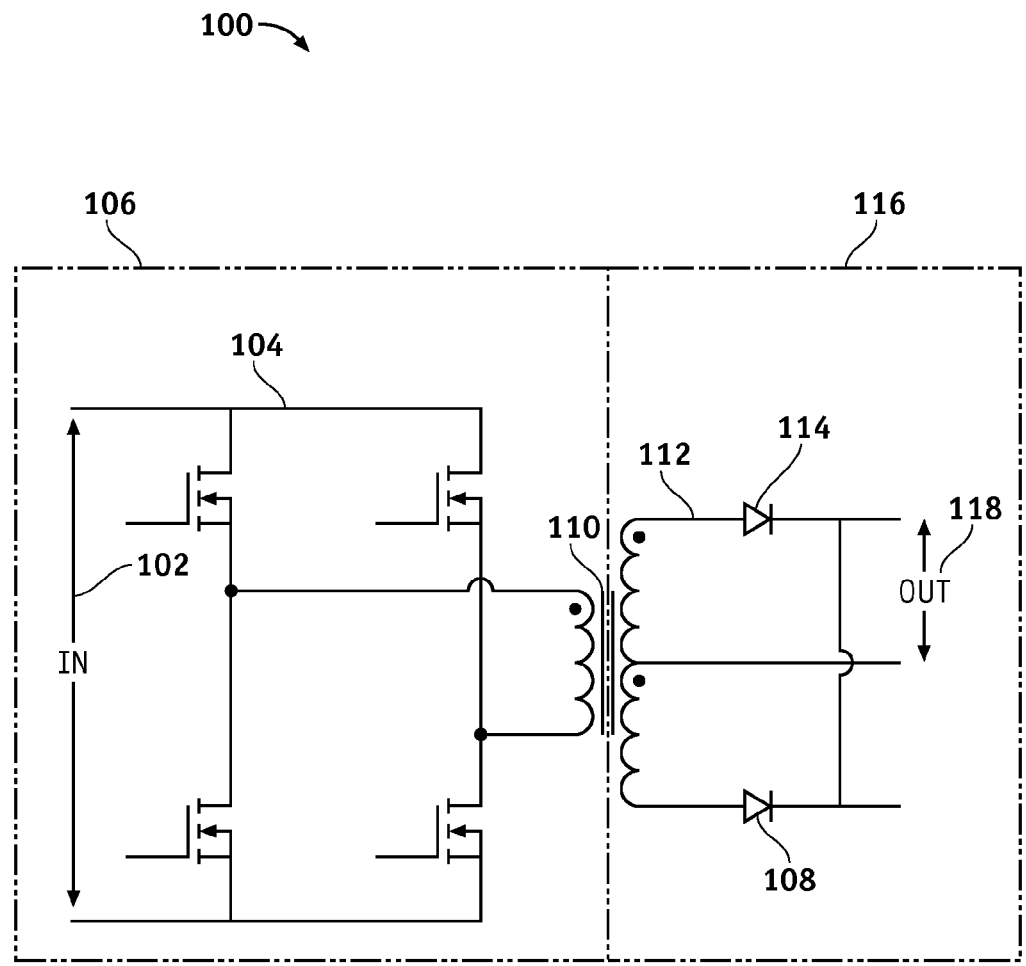
FIG. 1 is an illustration of an exemplary voltage conversion circuit cell structure according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to full bridge converters, transformers, low pass filters, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, DC-to-DC conversion for high power aircraft applications. Embodiments of the disclosure, however, are not limited to such aircraft or DC-to-DC conversion applications, and the techniques described herein may also be utilized in other applications. For example but without limitation, embodiments may be applicable to AC-to-DC conversion, DC-to-AC conversion, AC-to-AC conversion, or other conversion.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Embodiments of the disclosure provide, for example, a means to integrate a low voltage power source (e.g., about 40 to about 60 Vdc) with an aircraft electric power distribution system where a regulated dual polarity of about 270 Vdc for powering DC loads and a single polarity of about 600 to about 800 Vdc for voltage source inverters are required. A high conversion ratio from the low voltage (e.g., about 40 Vdc) to a high voltage (e.g., about 800 Vdc) may be accomplished at a high power (e.g., greater than about 1 kW). The low voltage power source may comprise, for example but without limitation, a fuel cell stack, a solar array, a battery, or other power source.

In an example embodiment, a high power DC-to-DC device and method for generating a dual polarity of, for example, about 270 Vdc, and/or a single polarity of, for example, about 600 Vdc to about 800 Vdc from a low voltage DC source such as, for example, a fuel cell stack or a battery is disclosed. A high power DC-to-DC architecture provides a topology of phase interleaved full-bridge converters, e.g. 4-phase interleaved full-bridge converters, with controllable phase shifts among the phase interleaved full-bridge converters. The phase interleaved full-bridge converters are coupled with transformers/rectifiers (e.g., 4) with some or all series-connected to one or more outputs.

FIG. 1 is an illustration of an exemplary voltage conversion circuit cell structure 100 according to an embodiment of the disclosure. Embodiments of the disclosure describe a high power converter that contains few or many blocks, defined as cells such as cell 100 (interchangeably referred to herein as circuit cell structure 100 or fundamental cell 100). The converter can achieve high power conversion as well as high voltage boost ratio.

The fundamental "cell" 100 comprises a full-bridge converter 104 (interchangeably referred to herein as a full-bridge isolated converter 104) at a primary side 106, one center-tapped transformer 110 and two rectifier diodes 114/108 at a secondary side 116 (interchangeably referred to herein as isolated secondary side 116). The full-bridge isolated converter 104 with a center-tapped rectifier 112 (interchangeably referred to herein as a full center-tapped rectifier 112 or secondary side rectifier 112) can be used in the field of power electronics for power conversion. A phase shifted PWM controller can be used for regulating a converter output voltage V_out 118. A voltage boost ratio for a single cell 100 is based on the following relationship between V-out 118 and V_in 102:

$$V\_out = f(\alpha, n, V\_in) = \alpha/(180°) n V\_in$$

where V_in 102 is an input to the full-bridge converter 104 from a source such as, but without limitation, a fuel cell; n is a turns ratio (interchangeably referred to herein as transformer ratio and/or transformer turns ratio) of the center-tapped transformer 110; and α is a phase shift angle.

Embodiments of the disclosure provide a topology for interconnecting the cells 100 and apply interleaving control methods to the topology to achieve high power and high-voltage boost ratio conversion.

Figure 2:
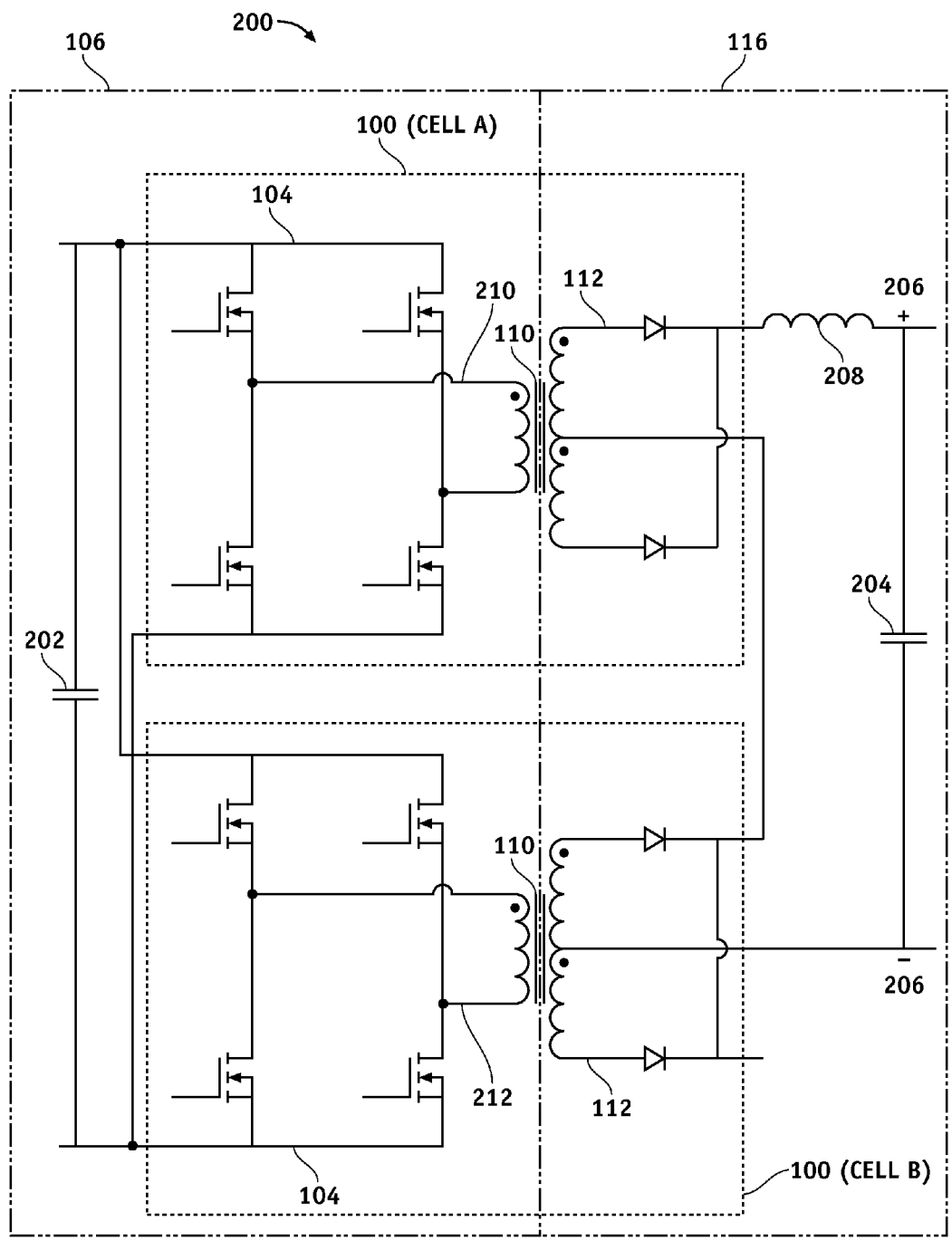
FIG. 2 is an illustration of an exemplary voltage conversion circuit two cell topology according to an embodiment of the disclosure.

FIG. 2 is an illustration of an exemplary voltage conversion circuit two cell topology 200 (interchangeably referred to herein as two cell topology 200 or two-cell structure 200) according to an embodiment of the disclosure. In an embodiment of the two-cell structure 200, the two full-bridge converters 104 at the primary side 106 are connected in parallel. This can increase the power level, i.e., provide higher input current capability of each of the full-bridge converters 104. The secondary side rectifier 112 outputs are connected in series, which increases the output voltage level by doubling a turns ratio of the center-tapped transformer 110. A voltage boost ratio for these two cells 100 (Cell A and Cell B) is based on the following relationship between V-out 206 and V_in 202.

$$V\_out = f(\alpha, n, V\_in) = \alpha/(180°) 2n V\_in,$$ where the parameters are explained above.

Also, a parallel-input series-output connection as shown in FIG. 2 ensures that current sharing will be equal between the two full-bridge converters 104 of the two-cell structure 200 at the primary side 106, assuming that the turns ratios of the center-tapped transformer 110 are the same for Cell A and Cell B. This is a very important feature for high power converter paralleling, since this topology does not need any additional current sharing control.

Furthermore, interleaving controls can double a voltage ripple frequency on the output filter 320/330 (FIG. 3) as well as a current ripple frequency at the primary side 106. A standard full-bridge isolated converter with a center-tapped rectifiers, has an output voltage ripple frequency equal to 2·fsw, where fsw is a switching frequency of closing switches Q1-Q4 in FIG. 3 controlled by a phase-shifted PWM controller. The input current ripple frequency is also 2·fsw.

According to embodiments of the disclosure, by introducing a phase angle β (interchangeably referred to herein as interleaving angle β) in interleaving between each of the cells 100, a ripple frequency will be doubled as 4·fsw. An input current ripple amplitude also is reduced because of an output filter (e.g., an output filter formed by inductor 208 and capacitor 204) seeing high frequency ripple and reduced output current ripple. These features will reduce output filter size, input filter capacitor size and minimize primary switch stress. The interleaving makes embodiments of the topology even more feasible for high power application.

Figure 3:
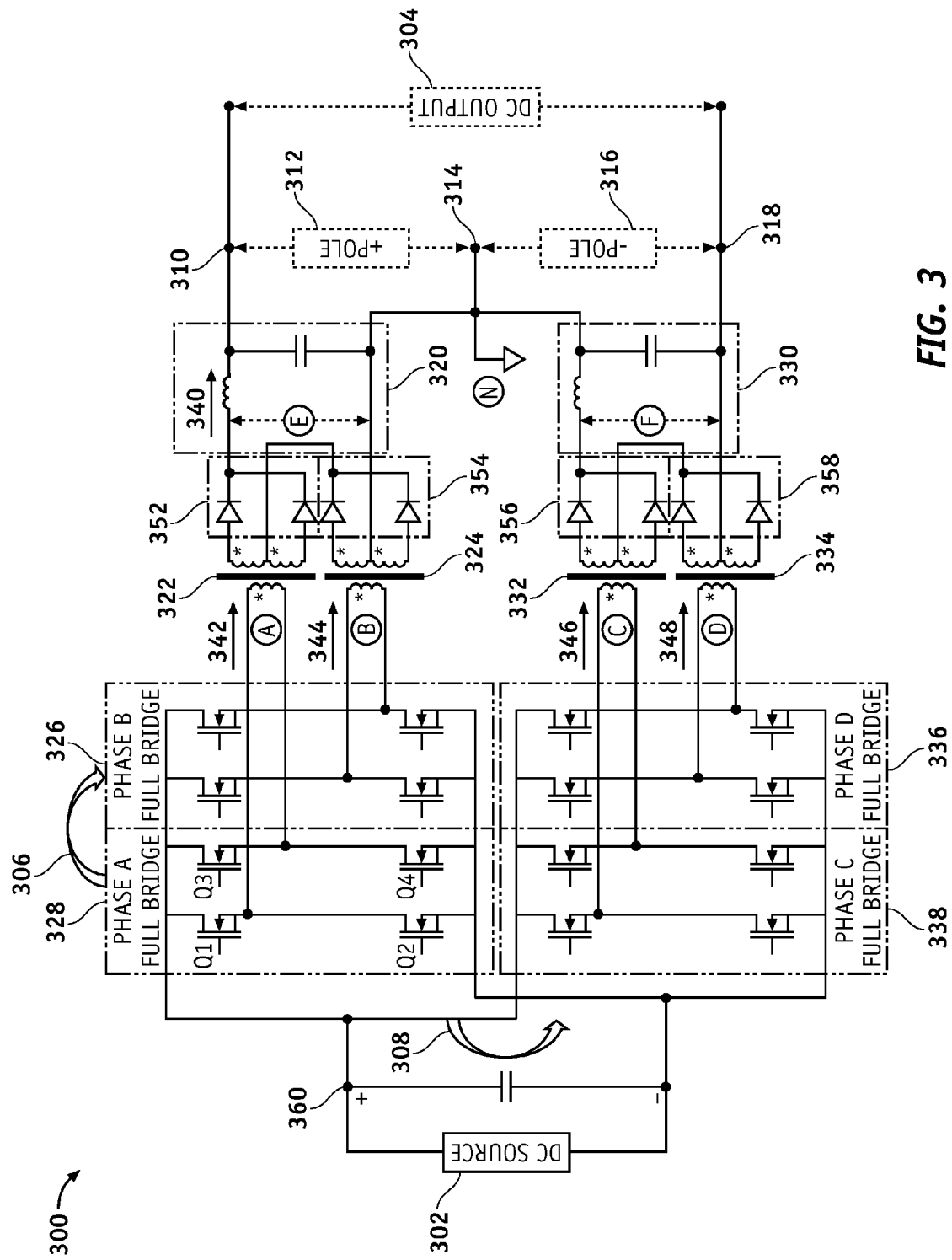
FIG. 3 is an illustration of an exemplary four-phase dual output interleaved voltage conversion circuit according to an embodiment of the disclosure.

FIG. 3 shows an exemplary interleaving configuration for a +/−270V converter. Since each of the cells 100 (FIG. 1) has an isolated secondary side 116, by grouping the cells 100 and pairing them with output filters 320/330 and feedback signals 708 (FIG. 7) at the secondary side 116, multiple isolated outputs can be configured. Within each regulated full-bridge converter 104 (FIGS. 1 and 2), current sharing between two cells can be warranted and configured by series connection of output center-tapped rectifier 112. At the primary side 106, all phases A, B, C, and D are connected in parallel and controlled with the interleaving angle β.

FIG. 3 is an illustration of an exemplary voltage conversion circuit (interchangeably referred to herein as converter 300, converter topology 300, or multi-phase voltage conversion system 300) according to an embodiment of the disclosure. Four substantially identical voltage converters (Phase A, B, C, D) each comprise a full-bridge converter (104 in FIGS. 1 and 2) connected to a center-tapped transformer (110 in FIGS. 1 and 2). The converter 300 comprises a Phase A voltage converter, a Phase B voltage converter, a Phase C voltage converter, and a Phase D voltage converter configured such that all of their inputs are connected to a DC power source 302 (interchangeably referred to herein as DC power input source 302, DC Voltage input source 302, DC Voltage source 302, or DC source 302). The Phase A voltage converter comprises a first full bridge converter 328, a first transformer 322, a first rectifier 352 (112 in FIGS. 1 and 2) and a first low pass filter 320 (interchangeably referred to herein as output filter 320). The Phase B voltage converter comprises a second full bridge converter 326, a second transformer 324, a second rectifier 354, and the first low pass filter 320. In this manner, Phase A and Phase B share the first low pass filter 320; however, in other embodiments each phase may comprise a separate low pass filter. The Phase C voltage converter comprises a third full bridge converter 338, a third transformer 332, a third rectifier 356 (112 in FIGS. 1 and 2), and a second low pass filter 330 (interchangeably referred to herein as output filter 330). The Phase D voltage converter comprises a fourth full bridge converter 336, a fourth transformer 334, a fourth rectifier 358, and the second low pass filter 330. In this manner, Phase C and Phase D share the second low pass filter 330; however, in other embodiments each phase may comprise a separate low pass filter.

The first full bridge converter 328 comprises an electronic circuit operable to enable conversion of a converter input voltage 360 (V_in 102 in FIG. 1, V_in 202 in FIG. 2) from the DC source 302 (interchangeably referred to herein as DC Voltage input source 302), to enable an output voltage to be applied across the first transformer 322 as either a positive or a negative voltage, and to enable a phase A output current 342 converted from the DC source 302 to be sent through the first transformer 322 as either a positive or a negative current. Closing switch Q1 and switch Q4 allows the phase A output current 342 to be sent through the first transformer 322 as a positive current. Closing switch Q2 and switch Q3 allows the phase A output current 342 to be sent through the first transformer 322 as a negative current. The first full bridge converter 328 operates at a first phase (Phase A).

The second full bridge converter 326 comprises an electronic circuit operable to enable conversion of the converter input voltage 360 from the DC source 302, to enable an output voltage to be applied across the second transformer 324 as either a positive or a negative voltage, and to enable a phase B output current 344 converted from the DC source 302 to be sent through the second transformer 324 as either a positive or a negative current. The second full bridge converter 326 operates at a second phase (Phase B). The Phase B may comprise, for example but without limitation, an about 90 degree phase shift from Phase A, an about 180 degree phase shift from Phase A, or other suitable phase shift.

As those of ordinary skill in the art would understand, a phase shift may comprise a phase of a signal offset in phase from another signal. For example, circuits of Phase B may be controlled with signals modulated with a phase offset about 90 degrees from Phase A.

The third full bridge converter 338 comprises an electronic circuit operable to enable conversion of the converter input voltage 360 from the DC source 302, to enable an output voltage to be applied across the third transformer 332 as either a positive or a negative voltage, and to enable a phase C output current 346 converted from the DC source 302 to be sent through the third transformer 332 as either a positive or a negative current. The third full bridge converter 338 operates at a third phase (Phase C). The phase C may comprise, for example but without limitation, an about 45 degree phase shift from Phase A, an about 90 degree phase shift from Phase A, or other suitable phase shift.

The fourth full bridge converter 336 comprises an electronic circuit operable to enable conversion of the converter input voltage 360 from the DC source 302, to enable an output voltage to be applied across the fourth transformer 334 as either a positive or a negative voltage, and to enable a phase D output current 348 converted from the DC source 302 to be sent through the fourth transformer 334 as either a positive or a negative current. The fourth full bridge converter 336 operates at a fourth phase (Phase D). The Phase D may comprise, for example but without limitation, an about 135 degree phase shift from Phase A, an about 270 degree phase shift from Phase A, or other suitable phase shift.

The first transformer 322, the second transformer 324, the third transformer 332, and the fourth transformer 334 are each operable to transform a first AC voltage of a first AC current (e.g., the phase A output current 342, the phase B output current 344, the phase C output current 346, and the phase D output current 348 respectively) to a second AC voltage at a ratio of, for example but without limitation, 1-to-6, 3-to-1, or other suitable transformer ratio.

In the embodiment shown in FIG. 3, the first rectifier 352, the second rectifier 354, the third rectifier 356, and the fourth rectifier 358 each comprise a full-wave rectifier. Alternatively, the first rectifier 352, the second rectifier 354, the third rectifier 356, and the fourth rectifier 358 may each comprise, for example but without limitation, a transformer center-tapped rectifier, a bridge rectifiers, or other suitable rectifier. The first rectifier 352 is operable to DC rectify an AC output of the first transformer 322. The second rectifier 354 is operable to DC rectify an AC output of the second transformer 324. The third rectifier 356 is operable to DC rectify an AC output of the third transformer 332. The fourth rectifier 358 is operable to DC rectify an AC output of the fourth transformer 334.

The first low pass filter 320 and the second low pass filter 330 may each comprise, for example but without limitation, an RC filter, an RLC filter, or other suitable low-pass filter. The first low pass filter 320 is operable to smooth an output of the first rectifier 352 in series with the second rectifier 354. The second low pass filter 330 is operable to smooth an output of the third rectifier 356 in series with the fourth rectifier 358.

Phases A and B and their respective transformers 322/524 and rectifiers 352/554 comprise an upper arm E of the converter 300, and Phases C and D and their respective transformers 332/534 and rectifiers 356/558 comprise a lower arm F of the converter 300.

Phases A and B are connected in series such that the converter 300 produces +270 Vdc at the upper arm E (referenced to N). Phases C and D are connected in series such that the converter 300 produces −270 Vdc at the lower arm F (referenced to N). The +270 VDC and −270 VDC outputs are obtained after rectification. A series connection of arms E and F allows the converter 300 to produce, e.g., 540~800 Vdc through a phase-shift modulation of full bridge converters. When Phase B is 90 degree lagging to Phase A in the upper arm, (so is Phase D to Phase C in the lower arm), and Phase C is 45 degree lagging to Phase A, the minimum input current ripple is achieved. In this manner an interleaved operation Mode 1 is achieved.

Phase B lagging Phase A (Phase D to Phase C) may be changed from 90 degree to 180 degree, and Phase C lagging to Phase A (Phase D to Phase B) may be changed from about 45 degree to about 90 degree. At about 180 degree lagging between Phase B and Phase A, and about 90 degree lagging between Phase C and Phase A, an interleaved operation Mode 2 is achieved. The converter 300 input current ripple is 2 times smaller compared to that of a single full bridge converter. In general, the converter 300 input current ripple and output voltage ripple are the functions of interleaving angles of 4 full-bridge converters.

Embodiments of the disclosure provide an architecture that uses an interleaved 4-phase full bridge converter coupled with transformers/rectifiers to produce about ±270 Vdc output voltage, and uses phase-shift modulation to produce up to about 800 Vdc output voltage from a source of variable low voltage from about 40 to about 60 Vdc. Outputs (e.g., 310, 318) of the converter 300 can either distribute about ±270 Vdc for common aircraft DC loads or about 600 about 800 Vdc for common aircraft voltage source inverters. In this configuration, a DC output 304 at a voltage (V_out 118 in FIG. 1 and V_out 206 in FIG. 2) comprises a series connection producing an output current 340.

Figure 4:
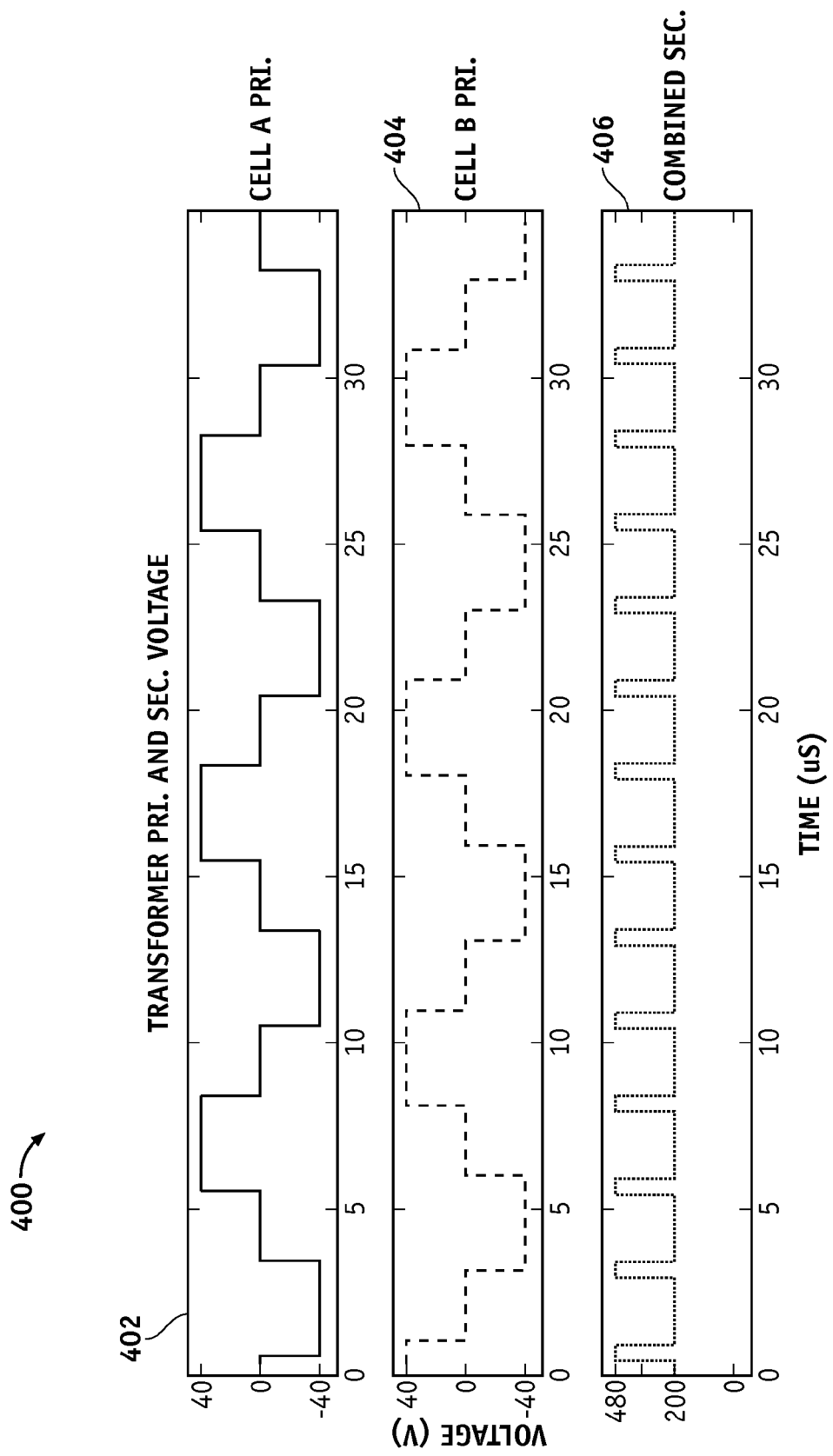
FIG. 4 is an illustration of an exemplary graph showing voltage conversion circuit transformer primary and secondary voltage waveforms for a two cell topology according to an embodiment of the disclosure.

FIG. 4 is an illustration of an exemplary graph 400 showing voltage conversion circuit transformer primary and secondary voltage waveforms for the two cell topology 200 (FIG. 2) according to an embodiment of the disclosure. The two cells 100 (A and B in FIG. 2) are interleaved at β=(360°)/(2N)=90°, N=2. Graph 400 is described below in conjunction with FIG. 2.

Graph 402 shows a primary side voltage of a Cell A primary side 210 of a first cell 100. Graph 404 shows a primary side voltage of a Cell B primary side 212 of a second cell 100. Graph 406 shows a voltage vs time of a combined secondary side voltage 206 of secondary sides 116 of combined first and second cells 100 of the two cell topology 200.

As shown in the graph 406, a combined secondary side voltage 206 of secondary sides 116 of the two cell topology 200 has a ripple at 4 times a switching frequency (fsw). A conventional center-tapped rectifier may have ripples at 2 times a switching frequency (fsw). Interleaving can double the ripple frequency of ripples of an output of the combined secondary side voltage 206. Hence, an output filter size of an output filter (e.g., an output filter formed by capacitor 204 and inductor 208) can be reduced.

Figure 5:
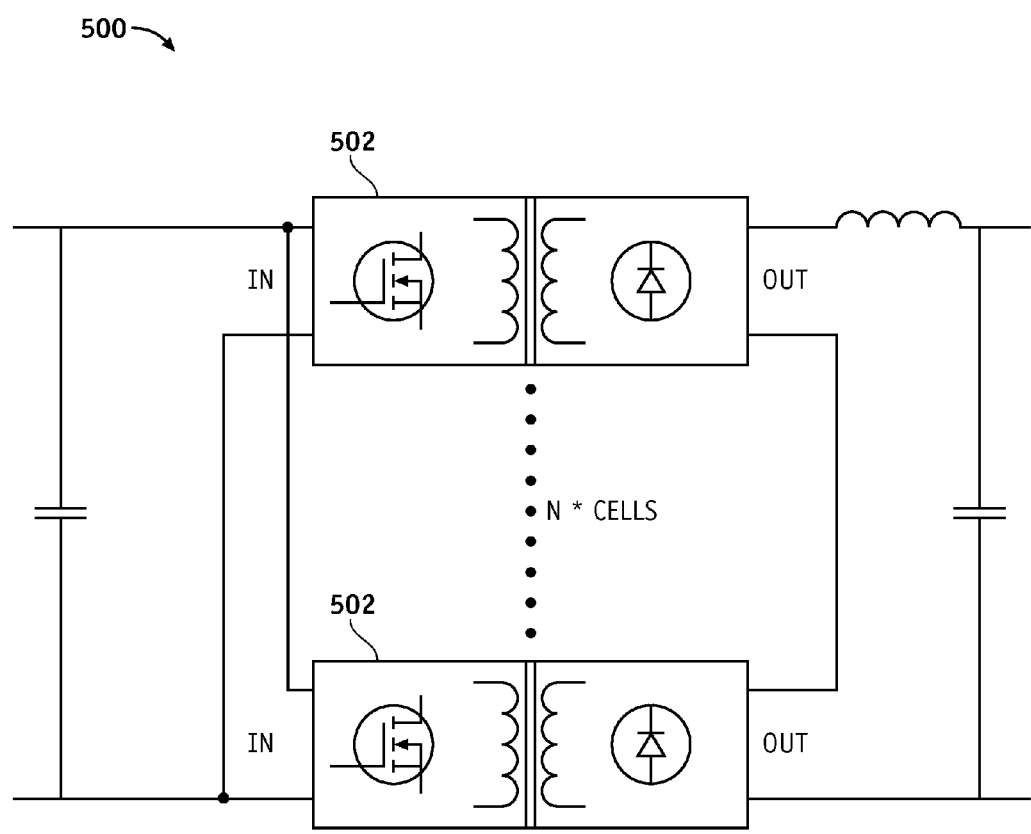
FIG. 5 is an illustration of an exemplary multi-phase voltage conversion circuit according to an embodiment of the disclosure.

FIG. 5 is an illustration of an exemplary multi-phase voltage conversion circuit 500 showing cells 502 (100 in FIG. 1) according to an embodiment of the disclosure. Based on the basic operation principle described above, the converter topology can be extended to a multiphase as shown in FIG. 5. For example, three full bridges in parallel with three center-tapped rectifiers 112 (112 in FIGS. 1, 2 and 356/358 in FIG. 3) in series may be used. The three phases are interleaved at 60 degrees. The current ripple frequency at the input side and the output voltage ripple frequency on the output filter will be increased 3 times to be 6·fsw. The voltage conversion ratio is triple of the single cell boost ratio. Again, the current sharing between three full bridges is ensured by the series connection at the secondary side 116. The voltage boost ratio for N cells is based on the following relationship where the parameters are described above:

$$V\_out = f(\alpha, n, V\_in) = \alpha/(180°) 2nV\_in$$

The total number of phases connected in parallel at the primary side 106 in series and at the secondary side 116 is not limited. The interleaving angle β is based on the following relationship:)

$$\beta = (360°)/(2N)$$

for phases to be optimized for high power operation. The voltage ripple frequency seen at the output filter and the input current ripple frequency is based on the following relationship:

$$2Nfsw$$

Furthermore, for the multiphase application, multiple isolated regulated output voltages can be achieved by appropriate connection at the secondary side.

Figure 6:
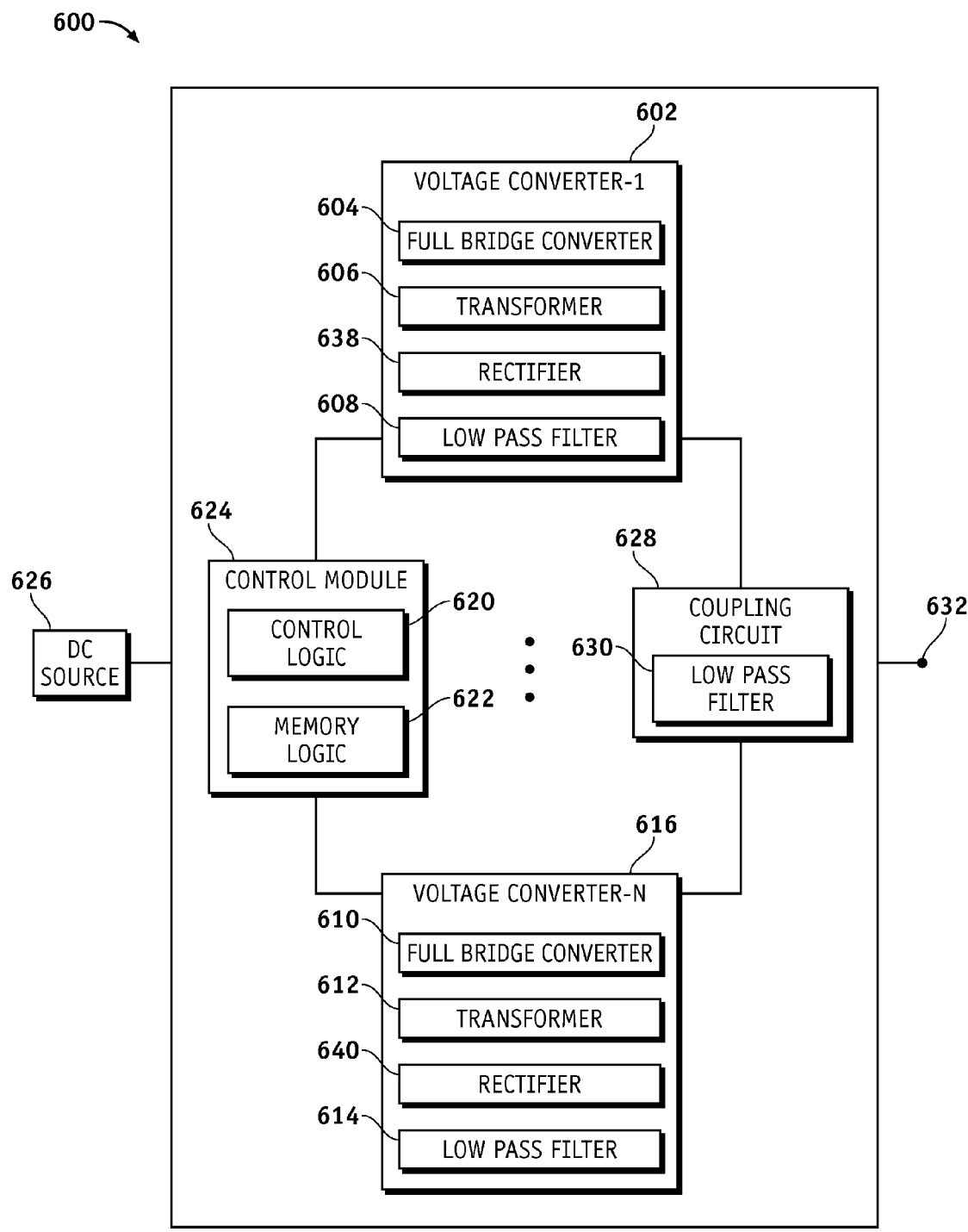
FIG. 6 is an illustration of an exemplary functional block diagram of a multi-phase voltage conversion system according to an embodiment of the disclosure.

FIG. 6 is an illustration of an exemplary functional block diagram of a voltage conversion system (system 600) according to an embodiment of the disclosure. An exemplary system 600 may comprise any number of input modules, any number of processor modules, any number of memory modules, and any number of other modules. The illustrated system 600 depicts a simple embodiment for ease of description. These and other elements of the system 600 are interconnected together, allowing communication between the various elements of system 600. In one embodiment, these and other elements of the system 600 may be interconnected together via a coupling circuit 628. Those of skill in the art will understand that the various illustrative blocks, modules, circuits, and processing logic described in connection with the embodiments disclosed herein may be implemented in hardware, computer-readable software, firmware, or any practical combination thereof.

To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The system 600 may have functions, material, and structures that are similar to the embodiments shown in FIG. 3. Therefore, common features, functions, and elements may not be redundantly described here.

The system 600 may comprise any number of voltage converters 1-N such as a voltage converter-1 602 and a voltage converter-N 616 (Nth voltage converter), the coupling circuit 628, and a control module 624. N may be an integer greater than 1. Higher values of N can be selected to achieve a higher voltage and power level by coupling more phases thereby achieving even smaller ripples at input side as well as at output side.

The voltage converters 1-N (602 to 616) are operable to convert an input voltage of a DC source 626 (302 in FIG. 3) to an output voltage at output 632. The voltage converters 1-N may each comprise, for example but without limitation, a full bridge converter 604/610, a transformer 606/612, a rectifier 638/640, a low pass filter 608/614, or other suitable circuit components.

For example, in one embodiment, the voltage converters 1-N may comprise four full bridge converters similar to the embodiment shown in the converter 300 of FIG. 3. In this case, the voltage converters 1-N comprise a structure wherein four full bridge converters 328/326/338/336 are coupled to a same source (DC source 302) at their inputs. Each of the full bridge converters 328/326/338/336 is coupled to each of the transformers 322/324/326/328 respectively, which is then connected to each of the rectifiers 352/354/356/358 respectively. The rectifiers 352/354/356/358 are connected in series through a center-tap of the transformers 322/324/326/328.

Alternatively, the voltage converters 1-N may be coupled in various ways to obtain high DC voltage, for example but without limitation, if a number of the full bridge converters 604/610 is more than 4 (e.g., N>4), then a series connection of outputs of more than 2 rectifiers may be accomplished. Furthermore, each embodiment can be expanded to a higher voltage and power level by coupling more phases and increasing N, which can achieve even smaller ripples at an input side as well as at an output side.

The coupling circuit 628 is operable to couple the voltage converters 1-N to one-another. The voltage converters 1-N may be coupled by the coupling circuit 628 in, for example but without limitation, series, parallel, a mixture of series and parallel, or other coupling configuration. The coupling circuit 628 may comprise zero or more low pass filters 630 operable to, for example but without limitation, smooth a ripple between stages of the voltage converters 1-N. In order to output a regulated DC voltage, one or more of the low pass filters 608/614/630 may be necessary.

The control module 624 (interchangeably referred to herein as controller 624) comprises control logic 620 and memory logic 622. The control module 624 is operable to generate phase control signals for controlling the voltage converters 1-N. The control module 624 may perform, for example but without limitation, sequential gate signal generation for transistors (e.g., Q1, Q2, Q3, Q4 in FIG. 3), phase-shift modulation control for each full bridge converter (e.g., 328/326/338/336 in FIG. 3) to achieve different output voltages, control phase interleaving to achieve minimum ripple size, and other suitable control functions. The control module 624 may set/control/determine the interleaving angle β and/or the phase shift angle α for each cell 100/502/602.

The control logic 620 comprises processing logic that is configured to carry out the functions, techniques, and processing tasks associated with the operation of the system 600. In particular, the processing logic is configured to support the system 600 described herein. The control logic 620 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration.

The memory logic 622 may comprise a data storage area with memory formatted to support the operation of the system 600. The memory logic 622 is configured to store, maintain, and provide data as needed to support the functionality of the system 600. For example, the memory logic 622 may store phase shift values, time intervals, voltage values, or other data.

In some embodiments, the memory logic 622 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory logic 622 may be coupled to the control logic 620 and configured to store, for example but without limitation, a database, a computer program that is executed by the control logic 620, an operating system, an application program, tentative data used in executing a program, or other application. Additionally, the memory logic 622 may represent a dynamically updating database containing a table for updating the database.

The memory logic 622 may be coupled to the control logic 620 such that the control logic 620 can read information from and write information to the memory logic 622. For example, as mentioned above, the control logic 620 may access the memory logic 622 to access the phase shift values, time intervals, voltage values, and other data.

As an example, the control logic 620 and memory logic 622 may reside in respective application specific integrated circuits (ASICs). The memory logic 622 may also be integrated into the control logic 620. In an embodiment, the memory logic 622 may comprise a cache memory for storing temporary variables or other intermediate information during execution of instructions to be executed by the control logic 620.

Figure 7:
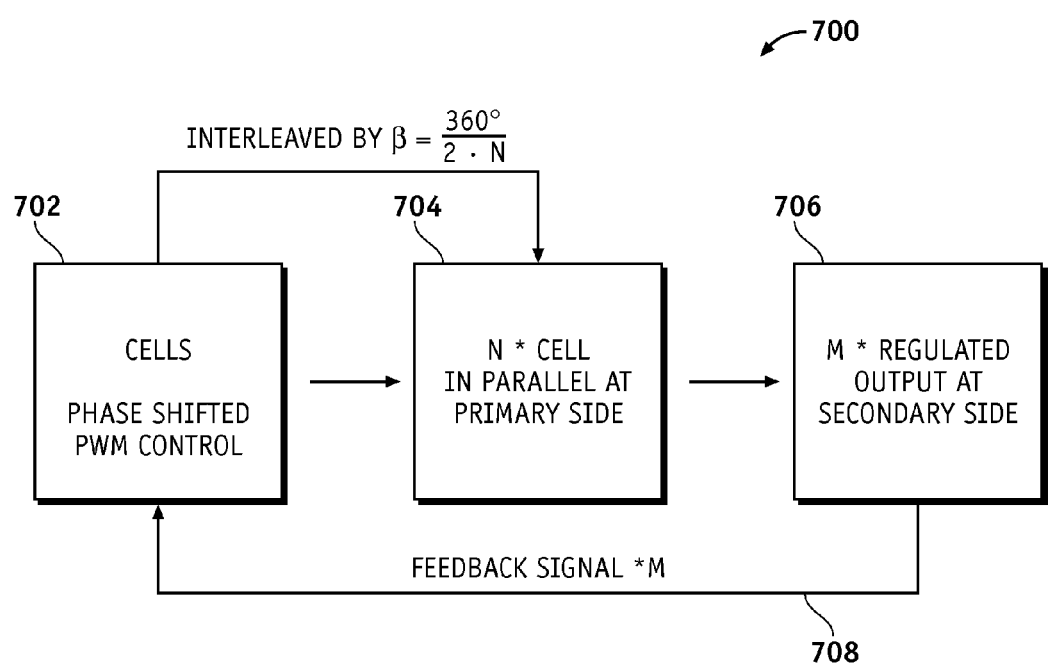
FIG. 7 is an illustration of an exemplary flowchart showing interleaving control process according to an embodiment of the disclosure.

FIG. 7 is an illustration of an exemplary flowchart showing an interleaving control process 700 according to an embodiment of the disclosure. A converter topology comprises two or more full-bridge converters 104, which are connected in parallel at the primary side 106 two or more center-tapped rectifiers 112 which are connected in series at the secondary side 116 and a filter (not shown) which may or may not have an inductor. The converter topology can be operated at the interleaving angle of $\beta=(360°)/(2\cdot N)$ between each pair (e.g., 306 between 328 and 326, or 308 between 328 and 338) of full-bridge converters 104 where N is a total number of full bridge converters in parallel 704 at the primary side 106 for an optimized high power operation. The M regulated output 706 such as the V_out 118 are provided at the secondary side 116. A feedback signal 708 is send from the M regulated output 706 at the secondary side 116 to the cells phase shifted PWM control 702 for voltage regulations.

The primary sides 106 of the cells 100 are connected in parallel at the input DC Voltage source 302 (FIG. 3). The secondary sides 116 of the cells 100 can be grouped in series or independent. Each group of secondary-series-connection can be an independent regulated DC output. The isolated, regulated outputs can be connected in series or in any polarity to one or more independent loads.

Figure 8:
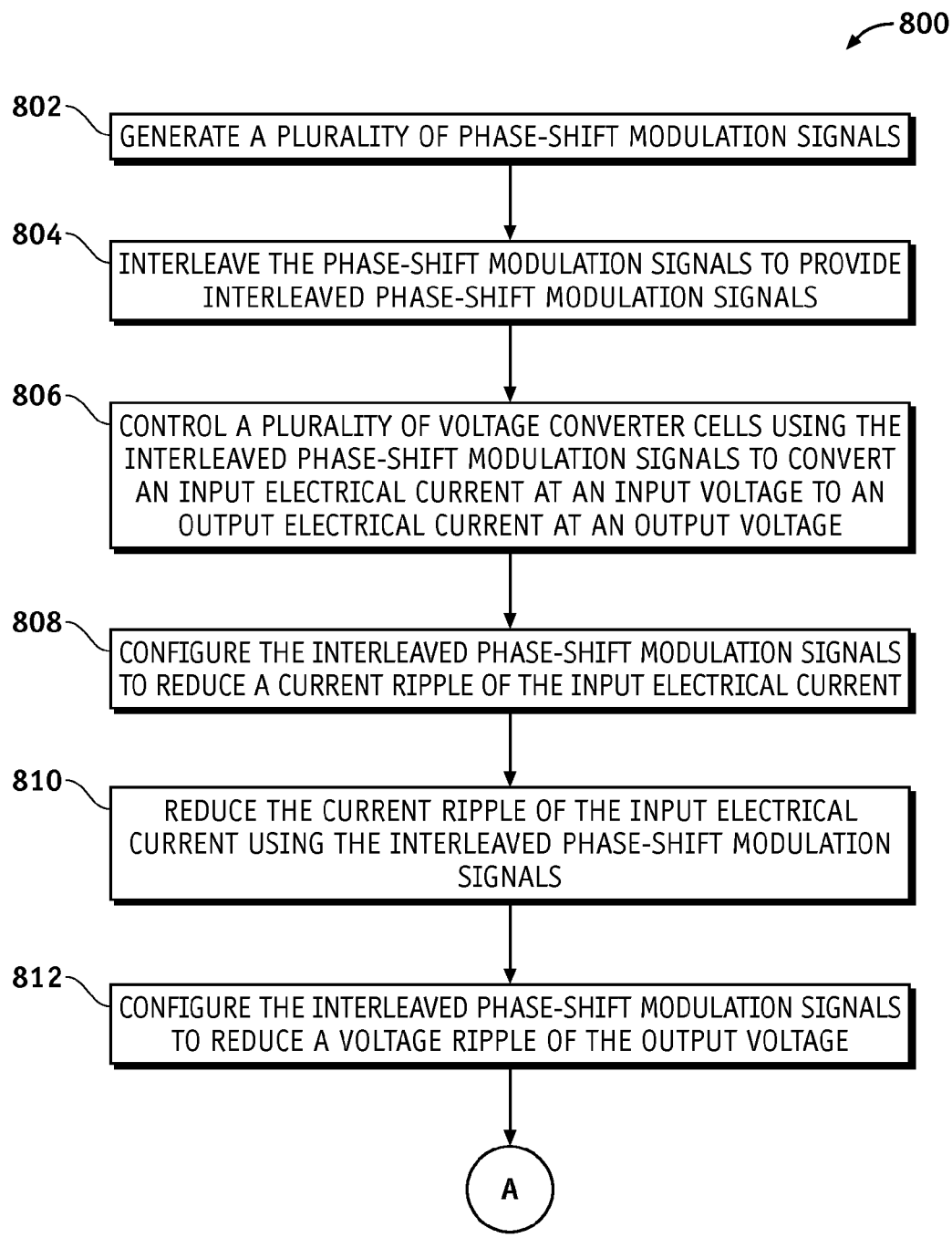
FIG. 8 is an illustration of an exemplary flowchart showing a voltage conversion process according to an embodiment of the disclosure.
Figure 8:
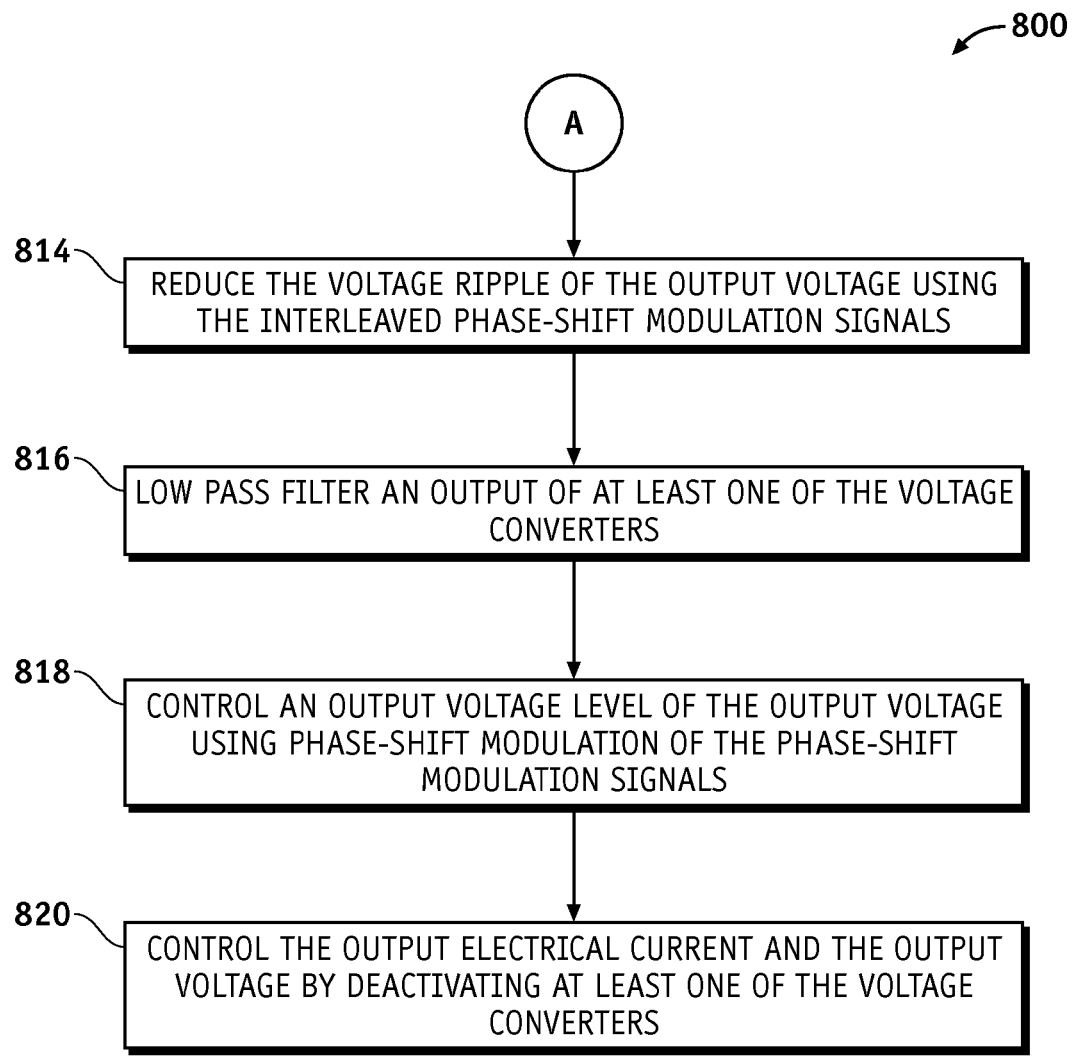

FIG. 8 is an illustration of an exemplary flowchart showing a voltage conversion process 800 (process 800) according to an embodiment of the disclosure. The various tasks performed in connection with the process 800 may be performed mechanically, by software, hardware, firmware, a computer-readable medium having computer executable instructions for performing the processes methods, or any combination thereof.

It should be appreciated that process 800 may include any number of additional or alternative tasks, the tasks shown in FIG. 8 need not be performed in the illustrated order, and the process 800 may be incorporated into a more comprehensive procedure or process having additional functionality not described in detail herein. For illustrative purposes, the following description of process 800 may refer to elements mentioned above in connection with FIGS. 1-7.

In practical embodiments, portions of the process 800 may be performed by different elements of the system 600 such as: the voltage converter-1 602, the voltage converter-N 616, the coupling circuit 628, and the control module 624, etc. Process 800 may have functions, material, and structures that are similar to the embodiments shown in FIGS. 1-7. Therefore, common features, functions, and elements may not be redundantly described here.

Process 800 may begin by generating a plurality of phase-shift modulation signals (task 802). A phase-shift modulation signal may be provided to achieve different output voltage levels according to a load requirement, or achieve a steady level of an output voltage with a varying input voltage.

Process 800 may continue by interleaving the phase-shift modulation signals to provide interleaved phase-shift modulation signals (task 804). The interleaved phase-shift modulation signals may be used to achieve a required output voltage and current ripple size.

Process 800 may continue by controlling a plurality of voltage converters such as the voltage converters 602/616 using the interleaved phase-shift modulation signals to convert an input electrical current at an input voltage to an output electrical current at an output voltage (task 806). Each of the voltage converter cells comprise a transformer comprising a primary side and a secondary side, a full-bridge voltage converter connected in parallel to the primary side, and a plurality of center-tapped rectifiers connected in series to the secondary side. The voltage converters 602/616 may each comprise a full bridge converter 604/610, a transformer 606/612, and a rectifier 638/640. The full-bridge converter 604/610 is coupled to at least one of the phase-shift modulation signals and the input electrical current, and is operable to convert the input electrical current to a first AC electrical current. The transformer 606/612 is coupled to the full bridge converter, and is operable to convert a first voltage of the first AC electrical current to a second voltage of a second AC electrical current. The rectifier 638/640 is coupled to the transformer, and is operable to convert the second AC electrical current to a DC output current. The outputs of the voltage converters 602/616 may be coupled, for example but without limitation, in series, in parallel, or other suitable configuration.

Process 800 may continue by configuring the interleaved phase-shift modulation signals to reduce a current ripple of the input electrical current (task 808). The interleaved phase-shift modulation signals may be configured to be interleaved at various interleaving angles, for example but without limitation, about 45 degrees, about 90 degrees, about 135 degrees, about 180 degrees, or other interleaving angle suitable to reduce the source input current ripple and/or to smooth transformer output voltages for a given application or device. For example, the interleaving angles may be selected such that the interleaved operation Mode 1 or the interleaved operation Mode 2, as explained above, is achieved. The operation Mode 1 may have about 50% less input current ripple compared to the operation Mode 2, and the ripple frequency may be doubled as well.

Process 800 may continue by reducing the current ripple of the input electrical current using the interleaved phase-shift modulation signals (task 810).

Process 800 may continue by configuring the interleaved phase-shift modulation signals to reduce a voltage ripple of the output voltage (task 812).

Process 800 may continue by reducing the voltage ripple of the output voltage using the interleaved phase-shift modulation signals (task 814).

Process 800 may continue by low pass filtering an output of at least one of the voltage converters (task 816).

Process 800 may continue by controlling an output voltage level of the output voltage using phase-shift modulation of the phase-shift modulation signals (task 818).

Process 800 may continue by controlling the output electrical current and the output voltage by deactivating at least one of the voltage converters (task 820). For example, in reference to FIG. 3, if the DC output 304 has a positive pole 312 of about +270V relative to a neutral N 314, and a negative pole 316 of about -270V relative to the neutral N 314, then the DC output 304 may be set to only the positive pole 312 of about +270V by deactivating the Phase C voltage converter and the Phase D voltage converter.

Figure 9:
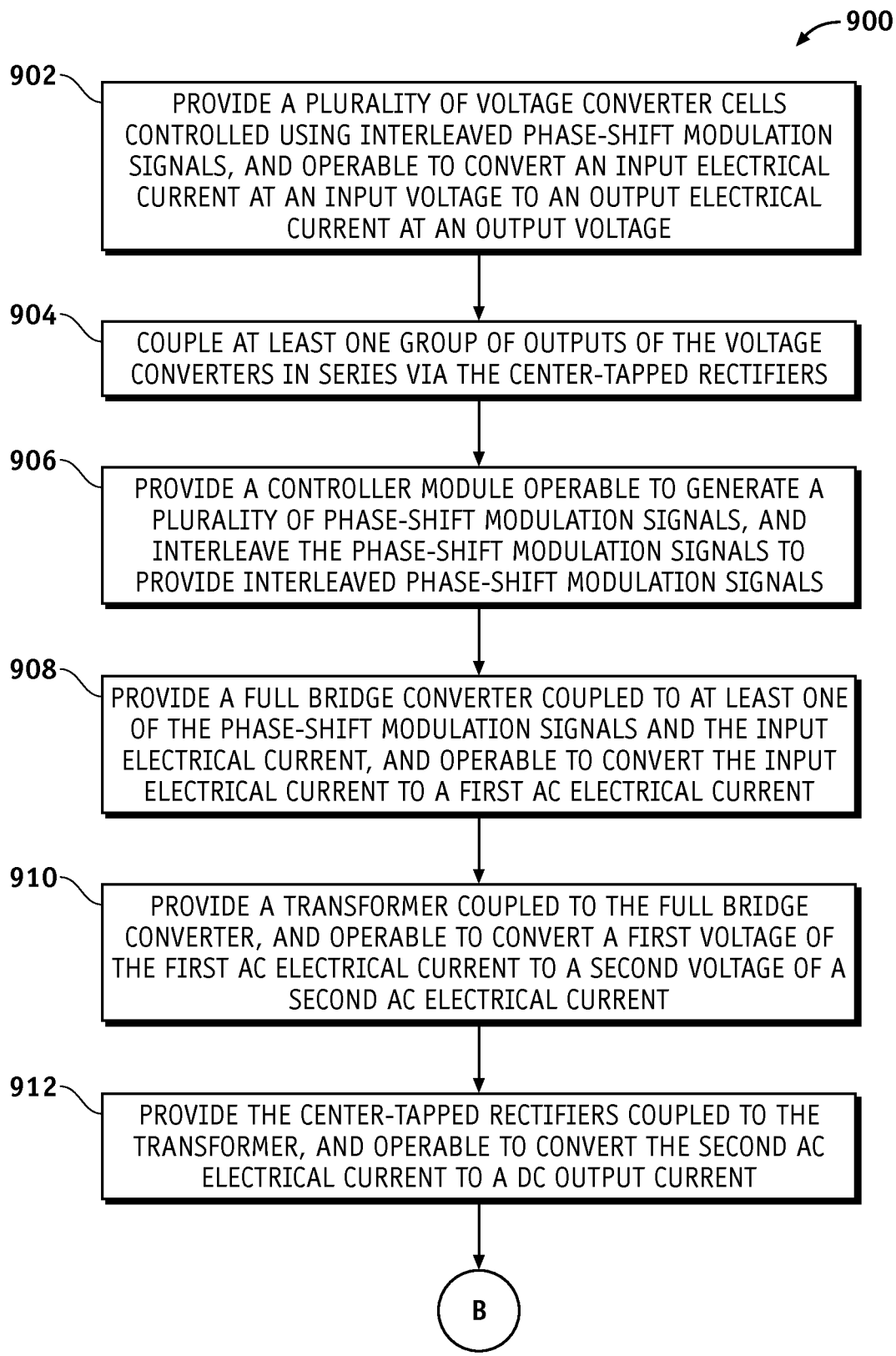
FIG. 9 is an illustration of an exemplary flowchart showing a process for providing a voltage conversion system according to an embodiment of the disclosure.
Figure 9:
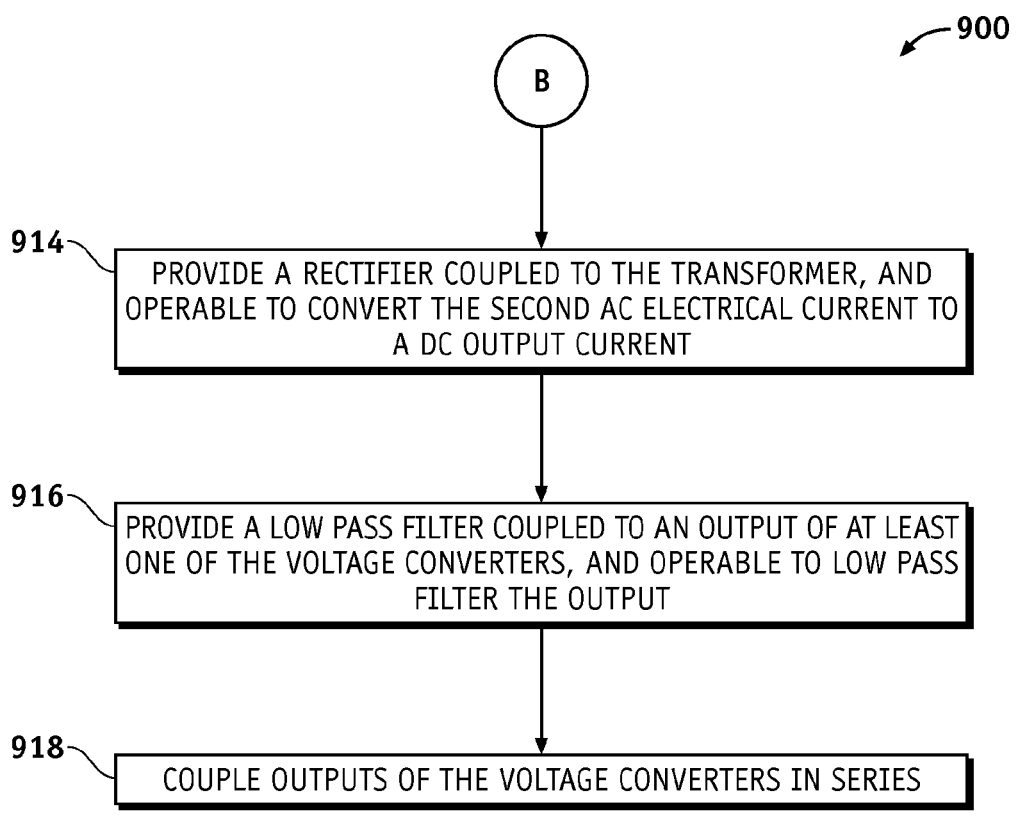

FIG. 9 is an illustration of an exemplary flowchart showing a process 900 for providing a voltage conversion system according to an embodiment of the disclosure. The various tasks performed in connection with process 900 may be performed mechanically, by software, hardware, firmware, a computer-readable medium having computer executable instructions for performing the processes, methods, or any combination thereof. For illustrative purposes, the following description of the process 900 may refer to elements mentioned above in connection with FIGS. 1-7.

It should be appreciated that the process 900 may include any number of additional or alternative tasks, the tasks shown in FIG. 9 need not be performed in the illustrated order, and the process 900 may be incorporated into a more comprehensive procedure or process having additional functionality not described in detail herein. In practical embodiments, portions of the process 900 may be performed by different elements of the system 600 such as: the voltage converter-1 602, the voltage converter-N 616, the coupling circuit 628, and the control module 624, etc. Process 900 may have functions, material, and structures that are similar to the embodiments shown in FIGS. 1-7. Therefore, common features, functions, and elements may not be redundantly described here.

Process 900 may begin by providing a plurality of voltage converter cells controlled using interleaved phase-shift modulation signals, and operable to convert an input electrical current at an input voltage to an output electrical current at an output voltage (task 902). Each of the voltage converter cells comprise a transformer comprising a primary side and a secondary side, a full-bridge voltage converter connected in parallel to the primary side, and a plurality of center-tapped rectifiers connected in series to the secondary side.

Process 900 may continue by coupling at least one group of outputs of the voltage converters in series via the center-tapped rectifiers (task 904).

Process 900 may continue by providing a controller module operable to generate a plurality of phase-shift modulation signals, and interleave the phase-shift modulation signals to provide interleaved phase-shift modulation signals (task 906).

Process 900 may continue by providing a full bridge converter coupled to at least one of the phase-shift modulation signals and the input electrical current, and operable to convert the input electrical current to a first AC electrical current (task 908).

Process 900 may continue by providing a transformer coupled to the full bridge converter, and operable to convert a first voltage of the first AC electrical current to a second voltage of a second AC electrical current (task 910).

Process 900 may continue by providing the center-tapped rectifiers coupled to the transformer, and operable to convert the second AC electrical current to a DC output current (task 912).

Process 900 may continue by providing a rectifier coupled to the transformer, and operable to convert the second AC electrical current to a DC output current (task 914).

Process 900 may continue by providing a low pass filter coupled to an output of at least one of the voltage converters, and operable to low pass filter the output (task 916).

Process 900 may continue by coupling outputs of the voltage converters in series (task 918).

In this manner, embodiments of the disclosure provide a means to integrate a low voltage power source with an electric power distribution system such as an aircraft power distribution system, where regulated dual polarity for powering DC loads and single polarity for voltage source inverters are required.

Compared to existing converters, the 4-phase full bridge phase-shift-modulation converter according to embodiments of disclosure yields: Smaller input current ripple for fuel cell protection: 4 full bridge converters are interleaved at 45 degrees, the primary DC source (e.g., fuel cell) sees 4 times switching frequency current ripple (peak to peak ripple is at least 4 times smaller) compared to an existing solution using only one full bridge converter. Therefore, an input current ripple is reduced significantly.

Also, compared to a general power converter, a smaller input/output filter size of an interleaved converter architecture according to embodiments of disclosure reduces input stage and output stage capacitor Root Mean Square (RMS) current. Additionally, reduced Electro Magnetic interference (EMI) filtering stage size of an interleaved converter architecture according to embodiments of disclosure reduces output current and voltage ripple thus reducing EMI filtering requirements. Further, embodiments of an interleaved converter architecture described herein reduce semiconductor device stress by sharing power through 4 phases.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the control module 624 to cause the control module 624 to perform specified operations. Such instructions, generally referred to as "computer program code" or "program code" (which may be grouped in the form of computer programs or other groupings), when executed, enable power utilization scheduling methods of the system 600.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 3-4 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated.

In relation to systems and circuits, the term "operable" means the system and/or the circuit is fully functional and calibrated, comprises logic for, and meets applicable operability requirements to perform a recited function when activated.

The invention claimed is:

1. A voltage conversion system comprising:
a plurality of voltage converter cells controlled using interleaved phase-shift modulation signals, and operable to convert an input electrical current at an input voltage to an output electrical current at an output voltage, wherein at least one voltage converter cell of the plurality of voltage converter cells comprises:
a transformer comprising a primary side and a secondary side;
a full-bridge voltage converter connected in parallel to the primary side; and
a plurality of center-tapped rectifiers connected in series to the secondary side;
wherein at least one group of outputs of the plurality of voltage converter cells are coupled in series via the plurality of center-tapped rectifiers.

2. The voltage conversion system of claim 1, wherein the full-bridge voltage converter of the at least one voltage converter cells is coupled in parallel to a DC voltage input source.

3. The voltage conversion system of claim 1, wherein each of the at least one group of the outputs of the plurality of voltage converter cells is independently regulated.

4. The voltage conversion system of claim 1, wherein each of the at least one group of the outputs is independently coupled to an independent load.

5. The voltage conversion system of claim 1, wherein the plurality of voltage converter cells are operated at an interleaving angle of 360° divided by twice a total number of the voltage converter cells in parallel at the primary side.

6. The voltage conversion system of claim 1, further comprising a low pass filter coupled to an output of at least one of the plurality of voltage converter cells, and operable to low pass filter an output of the at least one group of outputs.

7. The voltage conversion system of claim 6, wherein the low pass filter comprises an inductor.

8. The voltage conversion system of claim 1, further comprising a controller module operable to:
generate a plurality of phase-shift modulation signals; and
interleave the plurality of phase-shift modulation signals to provide the interleaved phase-shift modulation signals.

9. The voltage conversion system of claim 8, wherein the controller module is further operable to configure the interleaved phase-shift modulation signals to:
reduce a current ripple of the input electrical current, reduce a voltage ripple of the output voltage, or control the output electrical current and the output voltage by deactivating at least one of the voltage converters.

10. The voltage conversion system of claim 1, wherein the at least one voltage converter cell of the plurality of the voltage converter cells further comprises:
the full-bridge converter coupled to at least one of the phase-shift modulation signals and the input electrical current, and operable to convert the input electrical current to a first AC electrical current;
the transformer coupled to the full bridge converter, and operable to convert a first voltage of the first AC electrical current to a second voltage of a second AC electrical current; and
the center-tapped coupled to the transformer, and operable to convert the second AC electrical current to a DC output current.

11. A method for voltage conversion, the method comprising:
generating a plurality of phase-shift modulation signals;
interleaving the phase-shift modulation signals to provide interleaved phase-shift modulation signals; and
controlling a plurality of voltage converter cells using the interleaved phase-shift modulation signals to convert an input electrical current at an input voltage to an output electrical current at an output voltage, wherein at least one voltage converter cell of the plurality of voltage converter cells comprises:
a transformer comprising a primary side and a secondary side;
a full-bridge voltage converter connected in parallel to the primary side; and
a plurality of center-tapped rectifiers connected in series to the secondary side, wherein at least one group of outputs of the voltage converter cells are coupled in series via the plurality of center-tapped rectifiers.

12. The method of claim 11, further comprising configuring the interleaved phase-shift modulation signals to:
reduce a current ripple of the input electrical current, reduce a voltage ripple of the output voltage, or control the output electrical current and the output voltage by deactivating at least one of the voltage converters.

13. The method of claim 11, wherein the at least one the plurality of voltage converter cells further comprises:
the full-bridge converter coupled to at least one of the phase-shift modulation signals and the input electrical current, and operable to convert the input electrical current to a first AC electrical current;
the transformer coupled to the full bridge converter, and operable to convert a first voltage of the first AC electrical current to a second voltage of a second AC electrical current; and
the center-tapped coupled to the transformer, and operable to convert the second AC electrical current to a DC output current.

14. The method of claim 11, further comprising low pass filtering an output of at least one group of outputs.

15. The method of claim 11, further comprising controlling an output voltage level of the output voltage using phase-shift modulation of the phase-shift modulation signals.

16. The method of claim 11, further comprising controlling the output electrical current and the output voltage by deactivating at least one of the voltage cell of the plurality of voltage converter cells.

17. A method for providing a voltage conversion system, the method comprising:
providing a plurality of voltage converter cells controlled using interleaved phase-shift modulation signals, and operable to convert an input electrical current at an input voltage to an output electrical current at an output voltage, wherein at least one voltage converter cell of the plurality of voltage converter cells comprises:
a transformer comprising a primary side and a secondary side,
a full-bridge voltage converter connected in parallel to the primary side, and
a plurality of center-tapped rectifiers connected in series to the secondary side, and coupling at least one group of outputs of the voltage converter cells in series via the plurality of center-tapped rectifiers.

18. The method of claim 17, further comprising providing a controller module operable to:
   generate a plurality of phase-shift modulation signals; and
   interleave the phase-shift modulation signals to provide interleaved phase-shift modulation signals.

19. The method of claim 17, wherein providing the plurality of voltage converters converter cells further comprises:
   providing the full bridge converter of the at least one voltage converter cell coupled to at least one of the phase-shift modulation signals and the input electrical current, and operable to convert the input electrical current to a first AC electrical current;
   providing the transformer of the at least one voltage converter cell coupled to the full bridge converter of the at least one voltage converter cell, and operable to convert a first voltage of the first AC electrical current to a second voltage of a second AC electrical current; and
   providing the center-tapped rectifiers of the at least one voltage converter cell coupled to the transformer of the at least one voltage converter cell, and operable to convert the second AC electrical current to a DC output current.

20. The method of claim 17, further comprising
   providing a low pass filter coupled to an output of at least one group of outputs, wherein the low pass filter is operable to low pass filter the output.

* * * * *